United States Patent Office 3,130,230
Patented Apr. 21, 1964

3,130,230
RUSCOPINE AND RUSCOPEINE
Benjamin J. Frydman and Enrique Hug, Buenos Aires, Argentina, assignors to Olin Mathieson Chemical Corporation, New York, N.Y., a corporation of Virginia
No Drawing. Filed Dec. 21, 1960, Ser. No. 77,282
5 Claims. (Cl. 260—564)

This invention relates to the provision of new chemical compounds. More particularly this invention relates to alkaloids, herein called ruscopine and ruscopeine, obtained from the thistle *Carduus acanthoides*.

It is an object of this invention to provide a physiologically active alkaloid called ruscopine.

It is another object of this invention to provide a method of obtaining ruscopine from *Carduus acanthoides*.

It is an additional object of this invention to obtain ruscopeine from *Carduus acanthoides* and convert it to said ruscopine by a chemical conversion method of this invention.

In accordance with the extraction aspect of this invention, plants of the species *Carduus acanthoides* are first extracted with an organic solvent under neutral conditions yielding a solution which gives a positive alkaloid reaction in accordance with the tests set forth by Mayer in the Pharmacopeia of the United States, vol. XV, page 1097. Solvents fully miscible with water are particularly good for the extraction, although others can be employed. This extract, is first concentrated in vacuum, next made acidic by treatment with an aqueous acidic solution and, after filtering off the resulting insolubles, the clear acidic filtrate is made basic then extracted with an appropriate water-immiscible organic solvent of low molecular weight. The resulting extract contains the major portion of ruscopine and ruscopeine present in the starting plant material.

More particularly, in order to proceed with the extraction process of this invention, dried, cleaned and ground leaves of *Carduus acanthoides* are agitated at ambient temperature, or below if desired, with an organic solvent, for a period of time sufficient to permit solution of the active alkaloidal material. Suitable solvents for this purpose are alkanols such as the lower alkanols, e.g., methanol, ethanol, propanol, isopropanol; alkanones such as the di-lower alkyl-ketones, e.g., acetone and 2-butanone; and esters such as lower alkyl esters of lower alkanoic acids, e.g. ethyl acetate. The completeness of extraction will of course depend upon the period of time allowed for contact as well as the number of times the extraction process is repeated. As a practical matter, two extractions each lasting about 24 hours, are sufficient in the case of most of the solvents to insure the isolation of the desired components.

The solvent extracts are pooled and, if desired, concentrated, prior to being treated with an aqueous acid. The aqueous acid treatment is for the purpose of separating the desired salt-forming alkaloidal components from the undesired non-salt forming components. The acidification step involves merely contacting the polar solvent extracts with aqueous acid. It may be accomplished by continuous or by repeated batchwise extraction procedures. Suitable acids are those acids which will form water soluble salts with organic bases. Among the useful acids there may be named in the first place, the inorganic acids: hydrohalic acids such as hydrochloric acid, hydrobromic acid, hydroiodic acid, etc., other mineral acids such as nitric acid, sulfuric acid and phosphoric acid, and, among the organic acids, inter alia: lower alkanoic acids (e.g. formic, acetic, propionic acids); alkenoic acids (e.g., acrylic acid); aralkenoic acids (e.g., cinnamic acid); aralkanoic acids (e.g., α-phenylacetic and β-phenylpropionic acids); cycloalkanoic acids (e.g., cyclohexanoic acid); cycloalkenoic acids (e.g., cyclohexen-3-oic acid).

The insolubles which result upon acidification of the polar extracts are separated off, e.g. by centrifugation or filtration, and other useless non-alkaloidal components can be separated by extraction of this acidic solution with solvents immiscible with water. The combined acidic supernatants are adjusted to a pH between 9 and 12, preferably pH 11, by the addition of an aqueous inorganic base such as an alkali metal hydroxide (e.g. sodium hydroxide and potassium hydroxide) or an alkaline earth metal hydroxide (e.g. calcium hydroxide, magnesium hydroxide and barium hydroxide). The alkaline supernatant is then extracted with a suitable organic solvent immiscible with water to give an extract which is rich in ruscopine and ruscopeine. Especially suitable solvents are the halogenated hydrocarbons of less than eight carbon atoms such as chloroform, carbon tetrachloride, dichloroethylene, and trichloroethylene. It is noteworthy that nonpolar solvent extraction at a neutral pH yields an extract which contains substantially no physiologically active principles.

The rich organic extract is evaporated, preferably under vacuum, to yield a residue which retains the desired physiologically active principles, which latter can be obtained in purified form by chromatography in a column of alumina and then in a column of cellulose. A suitable chromatographic system employs acidic alumina having a pH of from 3.8 to 4.2. For the first chromatography the rich extract is adsorbed on the column of alumina from solution in a minor amount of a halogenated hydrocarbon, and then eluted by a series of halogenated hydrocarbonalkanolic mixtures in which the concentration of the alkanol is progressively increased. Ruscopeine and ruscopine are eluted as the concentration of the alkanol in the eluting mixture increases. Ruscopeine can be separated from the eluant by conventional procedures and obtained in substantially pure form by transformation into a salt. The alkaloid can be converted to its non-toxic acid addition salts by treatment with an acid. Suitable acids for this purpose are inorganic and organic acids of the character described previously, e.g. hydrochloric hydroiodic, nitric, sulfuric, acetic, propionic, enanthic, picric acids and the like.

The liquors obtained in separating ruscopeine by the above method of chromatography and all the other fractions from the same chromatography procedure that have physiological activity are chromatographed again in buffered cellulose powder and eluted with buffered butanol solution of constant composition following conventional procedures. Differential elution allows a separation of ruscopine from inactive principles and ruscopine can be obtained in a substantially pure form as a salt.

Ruscopine has the empirical formula $C_{16}H_{26}N_4O_2$, and the structural formula

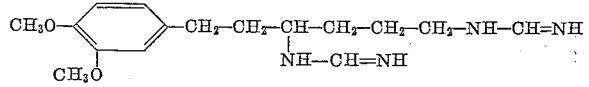

and may be named 1-(3,4-dimethoxyphenethyl)-N,N'-bis(iminomethyl)-1,4-butanediamine. It forms a solid hydrochloride salt containing two molecules of acid for every molecule of the alkaloid, giving a white crystalline compound having the following characteristics: M.P. 249–251°; $[\alpha]_D^{20} + 6.8 \pm 1.1°$ (c., 0.4 in water). It is soluble in methanol under neutral conditions and soluble in chloroform under basic conditions.

Ruscopine is a hypotensive agent, acting primarily through the ganglionic centers, and thus can be used in the treatment of conditions and diseases characterized by high blood pressure. It may be administered in conventional dosage forms preferably in the form of its pharmacologically acceptable acid addition salts.

The tetra-dehydro form of ruscopine, i.e., ruscopeine, has the empirical formula $C_{16}H_{22}N_4O_2$ and the structural formula

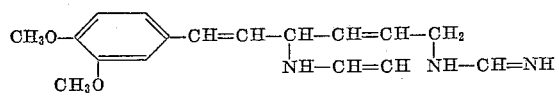

and may be named 1-(3,4-dimethoxystyryl)-N,N'-bis(iminomethyl)-2-butene-1,4-diamine. It forms a hydrochloride salt with two molecules of acid for every molecule of alkaloid. Ruscopeine takes up two molecules of hydrogen to yield ruscopine.

The following examples are presented to more fully illustrate the present invention all temperature being expressed in degrees centigrade.

EXAMPLE 1

(a) Preparation of Plant Material for Extraction 500 kg. of cleaned stalks of Carduus acanthoides are dried by leaving at room temperature, avoiding direct sunlight (under diffuse light), until almost constant weight is attained. The dried material (about 50 kg.) is collected and the dried leaves are ground in an electric grinder to a powder.

(b) Methanolic Extract 40 kg. of dried, powdered leaves prepared as in part (a) are extracted by agitation in the cold with 150 liters of methanol for 24 hours. The suspension is filtered, and the insoluble portions is again extracted for another 24 hours with 100 liters of methanol. The residue still shows a weak alkaloid reaction but is not extracted again. The methanolic extracts are combined and then concentrated under vacuum leaving a syrupy residue.

(c) Acid Extract

To the syrupy concentrate of part (b) there is added 10% of acetic acid with agitation. The mixture is agitated further for ten hours and allowed to stand for 24 hours at 5°. There is obtained an aqueous solution and a green resinous residue adhering to the sides of the container. Diatomaceous earth filter aid (Filter-Cel) is added in a sufficient quantity to transform the resinous pasty residue to a more solid condition, 500 g. of activated carbon (Darco) are then added and filtered. The insoluble residue is treated with 5 liters of 10% acetic acid solution, agitated for ten hours and filtered employing Filter-Cel as an aid. The insoluble is again extracted in a similar manner with 3 liters of a 10% acetic acid. The filter cake after a third extraction still shows a weak alkaloid reaction, but it is not again extracted. The clean acidic filtrates are combined and then further treated as described below.

(d) Elimination of Physiological Inactive Material

The aqueous acidic extract of part (c) is adjusted to pH 7 with 50% sodium hydroxide solution and then extracted with chloroform (10 x 20 liters). The chloroform extracts, that give only a faint positive Mayer's reaction and contain a fairly large amount of organic physiologically inactive substances, are discarded.

(e) Extraction at pH 11

The aqeous phase extracted with chloroform at pH 7 as indicated in (d) were adjusted to pH 11 with 50% sodium hydroxide solution and then extracted with chloroform until the chloroform layer after extraction gives a negative Mayer reaction (usually 20 extractions of 5 liters are needed). The chloroform extracts are combined, concentrated to 5 liters, dried over anhydrous calcium chloride and evaporated to dryness at low temperature in vacuum. There is obtained a fluid residue which is very hygroscopic in air. This fraction weighs about 40 g.

(f) Paper Chromatographic Study of the Extract Prepared in (e)

The extract at pH 11 is studied by paper chromatography on Whatman No. 1 paper employing the following mobile phase: 100 ml. of n-butanol and 100 ml. buffered solution at pH 5.6 are agitated and the upper layer formed is separated and used as mobile phase in the chromatography.

(The solution of pH 5.6 is prepared by adding to 90.5 ml. of 0.2 M sodium acetate, 9.5 ml. of 0.2 M acetic acid.)

Employing the above system and paper, the extract mentioned in (e) gives two spots with $R_f$ 0.44 and 0.11, giving different colors with the reagent and different fluorescence with UV light as explained below.

| Alkaloid | $R_f$ | Color | Fluorescence |
|---|---|---|---|
| Ruscopeine (large quantity) | 0.44 | Orange | Violet. |
| Ruscopine (small quantity) | 0.11 | Red | Blue. |

(g) Column Chromatography on Alumina of the Extract Prepared in (e)

A column (120 cm. in height and about 7 cm. in diameter) of 800 g. of alumina (activity II–III) and pH 3.8–4.2 is prepared. The 40 g. of extract prepared in (e) are dissolved in the minimum amount of chloroform and chromatographed. Elution is obtained by increasing amounts of methanol and fractions of 500 ml. are collected, showing the following pattern:

| Elution Solvent | Alkaloid reaction |
|---|---|
| Chloroform | Negative. |
| Chloroform 1% methanol | Do. |
| Chloroform 1.5% methanol | Slight positive. |
| Chloroform 2% methanol | Positive. |
| Chloroform 3% methanol | Negative. |
| Chloroform 4% methanol | Do. |
| Chloroform 5% methanol | Positive. |
| Chloroform 10% methanol | Do. |
| Chloroform 20% methanol | Slight positive. |
| Chloroform 50% methanol | Negative. |
| Chloroform 100% methanol | Do. |

Paper chromatography of the fractions showing a positive alkaloid reaction gives the following results:

| Fractions eluted with— | Alkaloids found on paper chromatography |
|---|---|
| Chlroform 1.5% methanol | ruscopeine. |
| Chloroform 2% methanol | Do. |
| Chloroform 5% methanol | ruscopeine and ruscopine |
| Chloroform 10% methanol | ruscopine |
| Chloroform 20% methanol | Do. |

(h) Elaboration of the Fractions Obtained in (g)

(1) *Fraction "2% methanol"-ruscopeine hydrochloride.*—The residue obtained by the evaporation of the chloroform is dissolved in 3 ml. of propanol and acidified to pH 2 with concentrated hydrochloric acid. After several days under refrigeration, the yellowish-white crystalline material (about 400 mg.), having a melting point of 180–185° is filtered off. Recrystallization from propanol gives ruscopeine hydrochloride (about 300 mg.) melting at 192–193°, $[\alpha]_D^{29}$ +7.3±1.2 (c., 0.4 in water).

(2) *Chromatography on cellulose of fractions "10% and 20% methanol."*—A cellulose column (4 cm. x 43 cm. with 500 g. cellulose powder) is washed first with a liter of the pH 5.6 buffered solution and then with n-butanol saturated with the buffered solution, until there is a homogeneous phase in the column. This takes 45 hours. A portion of the 500 mg. of residue obtained from the evaporation of the 10% and 20% methanolic fractions is dissolved in 5 ml. of butanol saturated with buffer and adsorbed on the initial part of the column employing the usual procedures to avoid mixing and diffusion with the solvent present in the column. The column is eluted with butanol saturated with buffer at pH 5.6, and 5 ml. fractions are collected. Typically fractions 59–73 contain ruscopine, as shown by paper chromatography employed as indicated in (f).

(3) *Fractions 59–73—Crystallization of ruscopine hydrochloride.*—Fractions 59–73 are united, 250 ml. of water are added to them and the mixture lyophilized. The residue, weighing 100 ml., is dissolved in 3 ml. of n-propanol, acidified to pH 2 with concentrated hydrochloric acid and, after the elimination of the insolubles by centrifugation, stored at 5° for several days, when the precipitation of dark brown needlelike crystals (about 80 mg.) having a melting point of about 208–210° takes place. Recrystallization from 95% ethanol with the aid of carbon gives about 40 mg. of white needles of ruscopine hydrochloride melting at 249–251°;

$[\alpha]_D^{20}$ +6.8°±1.1° (c., 0.4 in water)

EXAMPLE 2

*Ruscopeine Hydrochloride*

100 mg. of crude ruscopeine hydrochloride melting at 191–192° are dissolved in 2 ml. of cold ethanol. 72 ml. of ether are added causing permanent turbidity. The mixture is cooled in an ice bath for 3 hours giving white crystaline needles weighing about 90 mgs., M.P. about 192–193°; $[\alpha]_D^{29}$ +7.1°±1.2° (c., 0.4 in water); λ max. 236/238 mμ (log ε 4.5); 312 mμ (ε, 3.3) (in ethanol).

*Analysis.*—Calculated (for $C_{16}H_{22}N_4O_2 \cdot 2HCl$): C, 50.20; H, 6.45; N, 14,93; Cl. 18,86; $OCH_3$, 16.54. Found: C, 49.95, 49.66; H, 6.02, 6.21; N, 7.64 (titration), 14.47 (Dumas); Cl, 19.04; $OCH_3$, 16.57, 16.95.

EXAMPLE 3

*Ruscopeine Hydroiodide*

100 mg. of ruscopeine hydrochloride melting at 192–193° is dissolved in 3 ml. of water and made alkaline with 0.5 ml. of 2 N sodium hydroxide, producing fleeting turpidity. The mixture is extracted with chloroform until the extract no longer gives an alkaloid reaction (10 x 5 mls.). The aqueous layer gives a slight reaction with Mayer's reagent. The chloroform extract is dried over anhydrous calcium chloride for 12 hours and then evaporated giving an acidic residue (about 80 mg.) which is dissolved in 1 ml. of cold ethanol to which has been added 80 mg. of sodium iodide. The mixture is gently heated to dissolve the sodium iodide. Acetic acid is added to give a pH of 4 and the mixture is cooled over an ice bath. Crystallization begins in 2 hours. After 2 hours, it is filtered giving white needles melting at about 194–195°. Recrystallization from hot ethanol gives about 90 mg. of white needles of ruscopeine hydroiodide melting at 195–196°; λ max. 236–238 mμ (ε, 3.9), 312 mμ (ε, 2.9).

*Analysis.*—Calculated (for $C_{16}H_{22}N_4O_2 \cdot 2HI$): C, 34.39; H, 4.30. Found: C, 34.48; H, 4.61.

EXAMPLE 4

*Ruscopine Hydrochloride*

50 mg. of crude ruscopine hydrochloride melting at 208–209° is dissolved in 2 ml. of hot 95% ethanol. Cooling on an ice bath gives needle-like crystals melting at 235–236°, which on recrystallization several times from 95% ethanol melt at 250–251° $[\alpha]_D^{20}$ +6.8°±1.1° (c., 0.4 in water); λ max. 230 mμ (ε, 4.5) and 284 mμ (ε, 4.17). The hydrochloride of this alkaloid is relatively hygroscopic.

*Analysis.*—Calcd. (for $C_{16}H_{26}N_4O_2 \cdot 2HCl$): C, 50.54; H, 7.13; N, 14.77; Cl, 18.41. Found: C, 49.81; H, 7.88, 14.75; Cl, 18.29.

EXAMPLE 5

*Hydrogenation of Ruscopeine Hydrochloride to Ruscopine Hydrochloride*

500 mg. of ruscopeine hydrochloride ($R_f$ 0.44) melting at 192–193° are dissolved in 50 ml. of 95% ethanol. 2.5 ml. of glacial acetic acid and 300 mg. of platinum oxide are added. The solution and the catalyst are shaken in a hydrogen atmosphere at 40 p.s.i. for several hours (5–8 hours). After this time, chromatography indicates the presence of a base with $R_f$ 0.11. The catalyst is filtered off and the filtrate is concentrated under vacuum to 5 ml. The residue is dried with potassium hydroxide. The residue is dissolved in 5 ml. of N-propanol and acidified to a pH of 2 with concentrated hydrochloric acid. Cooling on an ice bath gives white needle-like crystals weighing about 380 mg. and melting at 249–250°. Recrystallization from ethanol gives needles of ruscopine hydrochloride melting at 250–251° $[\alpha]_D^{20}$ +6.7°±1.2°; λ max. 230 (ε, 4.5) and 284 mμ(ε, 4.17).

What is claimed is:

1. A compound selected from the group consisting of 1 - (3,4 - dimethoxyphenethyl)-N,N'-bis(iminomethyl)-1,4 - butanediamine, 1 - (3,4-dimethoxystyryl)-N,N'-bis-(iminomethyl)-2-butene-1,4-diamine and salts thereof with pharmacologically acceptable acids.

2. 1 - (3,4 - dimethoxyphenethyl) - N,N' - bis(iminomethyl)-1,4-butanediamine hydrochloride.

3. 1 - (3,4 - dimethoxystyryl) - N,N'-bis(iminomethyl)-2-butene-1,4-diamine hydrochloride.

4. 1 - (3,4 - dimethoxyphenethyl)-N,N'-bis(iminomethyl)-1,4-butanediamine.

5. 1 - (3,4 - dimethoxystyryl)-N,N'-bis(iminomethyl)-2-butene-1,4-diamine.

References Cited in the file of this patent

UNITED STATES PATENTS 2,575,991    Baltzly et al. _____ Nov. 20, 1951

OTHER REFERENCES

Neber et al.: Ann. der Chem., vol. 467, pp. 52–62 (1928).
Lorz et al.: J.A.C.S., vol. 71, pages 3992–3994 (1949).
Wagner et al.: "Synthetic Organic Chemistry," page 7 (1953).
Fanta et al.: J.A.C.S., vol. 78, pages 1434–1437 (1956).
Crow et al.: C. A., vol. 50, page 1057 (1956).